(12) United States Patent
Payne

(10) Patent No.: US 8,706,601 B1
(45) Date of Patent: Apr. 22, 2014

(54) COMPUTER-BASED SYSTEM FOR COMPUTING SENSITIVITIES OF A BEHAVIORALLY PATH-DEPENDENT FINANCIAL PRODUCT VALUE

(71) Applicant: Genesis Financial Development, Inc., Mississauga (CA)

(72) Inventor: Richard C. Payne, Mississauga (CA)

(73) Assignee: Genesis Financial Development, Inc., Mississauga, ON (CA)

(*) Notice: Subject to any disclaimer, the term of this patent is extended or adjusted under 35 U.S.C. 154(b) by 0 days.

(21) Appl. No.: 13/787,060

(22) Filed: Mar. 6, 2013

Related U.S. Application Data

(60) Provisional application No. 61/615,055, filed on Mar. 23, 2012.

(51) Int. Cl.
*G06Q 40/00* (2012.01)

(52) U.S. Cl.
USPC .......................................... 705/36 R; 705/35

(58) Field of Classification Search
USPC ........................................................... 705/35
See application file for complete search history.

(56) References Cited

U.S. PATENT DOCUMENTS

| | | | |
|---|---|---|---|
| 7,716,075 B1 | 5/2010 | Payne | |
| 8,131,612 B1 | 3/2012 | Payne | |
| 2004/0254824 A1* | 12/2004 | Loucaides et al. | 705/8 |
| 2005/0131796 A1* | 6/2005 | Bridges et al. | 705/36 |
| 2005/0187855 A1* | 8/2005 | Brennan et al. | 705/37 |

OTHER PUBLICATIONS

Aho, Alfred V., Jeffrey D. Ullman, "The DAG Representation of Basic Blocks". Principles of Compiler Design, 3rd Edition, 1979, pp. 418-423, Addison-Wesley Publishing Company.

Dlhlquist, Germund, Äke Björck. "Numerical Methods," pp. 306-311, 1974, Prentice-Hall, Inc., Englewood Cliffs, New Jersey.

Forth, Shaun A., Mohamed Tadjouddine and John D. Pryce. "Jacobian Code Generated by Source Transformation and Vertex Elimination can be as Efficient as Hand-Coding," ACM Transactions on Mathematical Software (TOMS), vol. 30, Issue 3, Sep. 2004, pp. 266-299, Cranfield University.

Giering, Ralf and Thomas Kaminski. "Recipes for Adjoint Code Construction," (ACM Transactions on Mathematical Software, vol. 24, No. 4, Dec. 1998, pp. 437-474, http://citeseerx.ist.psu.edu/viewdoc/summary?doi=10.1.1.30.7838; Max-Planck-Institut fur Meteorologie.

Golub, Gene H. And Charles F. Van Loan. "Matrix Computations," Second Edition, pp. 70-73, 1979, The Johns Hopkins University Press, Baltimore and London.

(Continued)

*Primary Examiner* — William Rankins
(74) *Attorney, Agent, or Firm* — Simpson & Simpson, PLLC

(57) ABSTRACT

A computer-based system including: a memory unit configured to store computer readable instructions, path-dependent behavioral assumptions, and economic variables; and a processor configured to execute the computer readable instructions to perform a vectorized adjoint differentiation forward pass including: generating a full or pruned directed acyclic graph (DAG) representation of a procedure for computation of the behaviorally path-dependent value for the financial product; computing, using the DAG representation, the behaviorally path-dependent value for the financial product; and performing an adjoint differentiation backward pass on said full or pruned DAG representation to obtain a result. The processor is configured to execute the computer readable instructions to determine, using the result, a set of sensitivities for the behaviorally path-dependent value for the financial product; and display the set of sensitivities for the behaviorally path-dependent value on a graphical user interface for the at least one specially programmed computer.

6 Claims, 1 Drawing Sheet

(56) References Cited

OTHER PUBLICATIONS

Griewank, Andreas and Shawn Reese. "On the Calculation of Jacobian Matrices by the Markowitz Rule for Vertex Elimination," pp. 1-11, Oct. 1991; http://info.mcs.anl.gov/pub/tech_reports/reports/P267.ps.Z.

Hakansson, Nils H. and William T. Ziemba. "Capital Growth Theory," Handbooks in OR & MS, vol. 9. pp. 65-86, 1995, Available at: http://www.hakansson,com/nils/papers/capital95.pdf.

Haslem, John A., H. Kent Baker and David M. Smith. "Performance and Characteristics of Actively Managed Retail Mutual Funds with Diverse Expense Ratios," Financial Services Review 17 pp. 49-68, 2008, Available at: http://papers.ssrn.com/sol3/papers.cfm?abstract_id=1155776.

Hubbard, John Hamal and Barbara Burke Hubbard. "Vector Calculus, Linear Algebra, and Differential Forms: A Unified Approach," Theorem 1.8.4, 2nd ed., pp. 150, 2002, Prentice Hall, Uppder Saddle River, NJ 07458.

Hui, Roger K.W. "An Implementation of J," Iverson Software, Inc., 1992, Toronto, Ontario, Canada M5S 2K9.

Hull, John. "Options, Futures, and Other Derivative Securities," pp. 214-219, 1989, Prentice-Hall International, Inc.

Investment Company Institute, "2011 Investment Company Fact Book," 51st Ed., 2011, Available at: http://www.ici.org/pdf/2011_factbook.pdf.

Juedes, David and Andreas Griewank. "Implementing Automatic Differentiation Efficiently." pp. 1-15, Oct. 1990, Available at: http://www.crpc.rice.edu/softlib/TR_scans/CRPC-TR90057throughTR90088/CRPC-TR90074.PDF; Center for Research on Parallel Computation, Riche University, Houston, TX 77251-1892.

Le, Truc and Eckhard Platen. "Approximating the Growth Optimal Portfolio with a Diversified World Stock Index," Quantitative Finance Research Centre, Research Paper 184, Sep. 2006, Available at: http://qfrc.uts.edu.au/research/research_papers/rp184.pdf; University of Technology Sydney.

Neidinger, Richard D., "Introduction to Automatic Differentiation and MATLAB Object-Oriented Programming," SIAM Review, vol. 52, No. 3. pp. 545-563, 2010, Available at: http://scitation.aip.org/getpdf/servlet/GETPDFSERVLET?filetype=pdf&id=SIREAD000052000003000545000001&idtype=cvips&doi=10.1137/080743627&prog=normal&bypassSSO=1.

"Nikkei 225 Stock Market Index Historical Graph." (May 14, 2013). Available at: http://www.forecast-chart.com/historical-nikkei-225.html.

Rebonato, Riccardo. "Modern Pricing of Interest-Rate Derivatives," The LIBOR Market Model and Beyond, Section 7.4.3, 2002, Princeton University Press, Princeton and Oxford.

Speelpenning, Bert. "Compiling fast partial derivatives of functions given by algorithms," pp. 1-75, Jan. 1980, Department of Computer Science, University of Illinois at Urbana-Champaign, Urbana, Illinois.

Strang, Gilbert. "Linear Algebra and Its Applications," Second Edition, pp. 141-143, 1980, Academic Press.

Tavella, Domingo and Curt Randall. "Pricing Financial Instruments: The Finite Difference Method," pp. 56-57, 2000, John Wiley & Sons, Inc.

"The RetireOne Transamerica Solution." Aria Retirement Solutions, 2012, Available at: http://aria4advisors.com/wp-content/uploads/2012/01/RetireOne_Transamerica_Investor-Brochure_0112.pdf.

Werbos, Paul J. "Backwards Differentiation in AD and Neural Nets: Past Links and New Opportunities," National Science Foundation, Room 675, Arlington, VA 22230, Section 3.1, Available at: http://www.werbos.com/AD2004.pdf.

Werbos, Paul John. "The Roots of Backpropagation: From Ordered Derivatives to Neural Networks and Political Forecasting," pp. 70-75 and pp. 256-263, 1994, John Wiley & Sons, Inc.

http://www.sec.gov/Archives/edgar/data/845091/000119312511270213/0001193125-11-270213-index.htm (last visited Jul. 1, 2013 at 6:15PM).

* cited by examiner

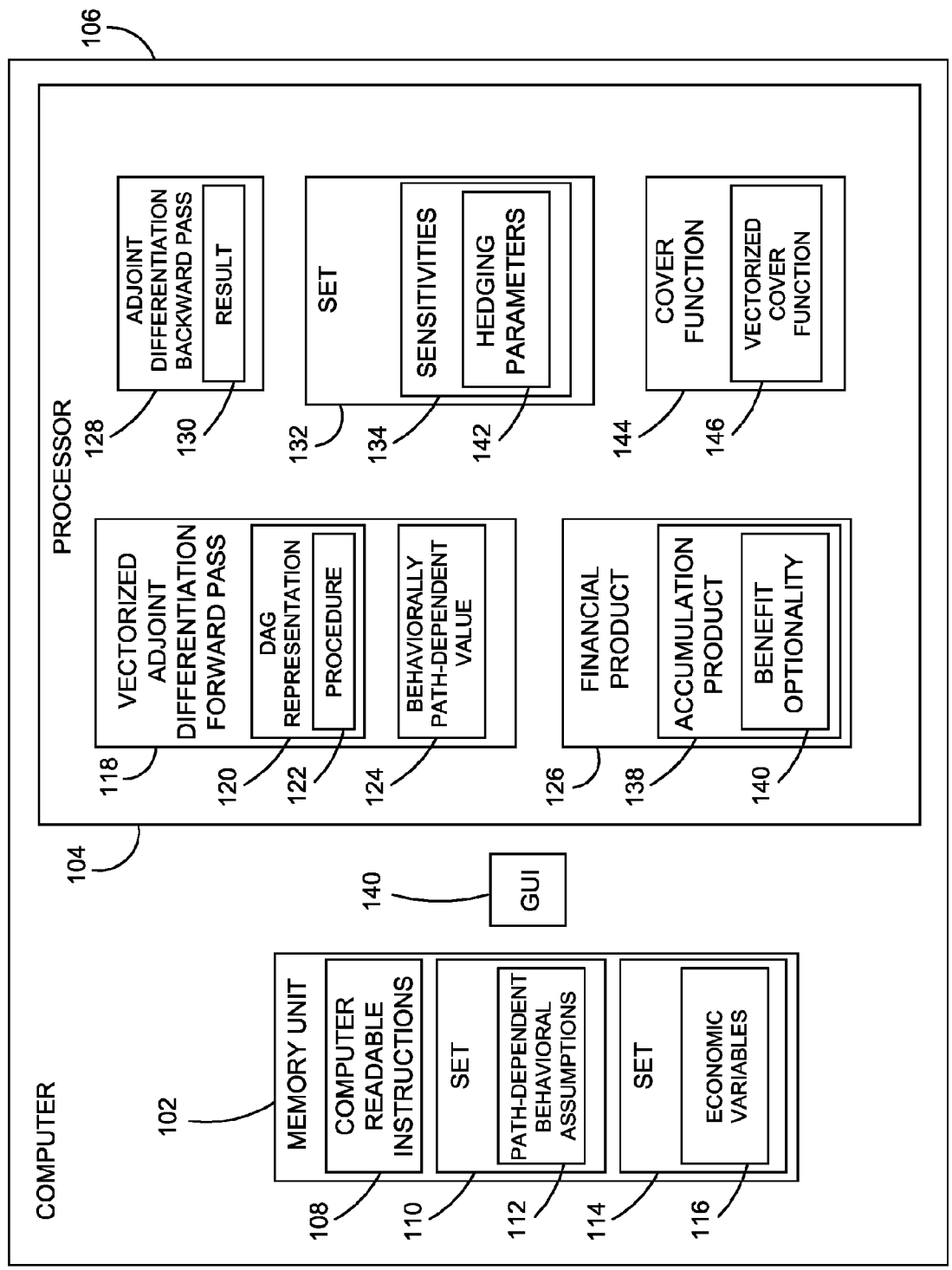

COMPUTER-BASED SYSTEM FOR COMPUTING SENSITIVITIES OF A BEHAVIORALLY PATH-DEPENDENT FINANCIAL PRODUCT VALUE

CROSS-REFERENCE TO RELATED APPLICATIONS

This application claims the benefit under 35 U.S.C. §119 (e) of U.S. Provisional Application No. 61/615,055, filed Mar. 23, 2012.

REFERENCE TO COMPUTER PROGRAM LISTING APPENDIX

The present application includes a computer program listing appendix. The appendix contains an ASCII text function of the computer program listing or sample file input data as follows:
Adjoint3.txt 52 KB Created Mar. 16, 2012
Adjhelp1.txt 2 KB Created Apr. 4, 2011
Svd3.txt 6 KB Created Jan. 13, 2005

TECHNICAL FIELD

The invention relates generally to a system and method for computing sensitivities of a behaviorally path-dependent financial product value.

BACKGROUND

The severe volatility displayed by financial markets in recent years has led many investors to reassess or revise their investment plans and especially their retirement plans. Central bank policies have made the returns from fixed-income investments increasingly unattractive, as interest rates drop to levels last seen in the 1940's. A reasonable outlook for fixed-income investments is that they are unlikely to provide sufficient income in retirement because of low yields, and may in fact lose value if interest rates do eventually rise (since bond market values would then drop). It seems clear that some degree of equity exposure is necessary for investors to have any hope of achieving positive real rates of return, but equity investment entails its own risks.

Additionally, investors and their advisors are becoming aware of the long-run impact of fees, and that this impact is relatively larger in a low-return environment. For instance, assuming 1.5% per year investment fees (these could be a product-level spread in a deferred annuity or CD, or the management expense for an actively managed mutual fund), and ignoring taxes, here are the results of investing $1 for thirty years, at two different gross rates of return:
  8% gross return: $10.0627, 6.5% return net of fees $6.61437: therefore fees are $3.44833, and have absorbed 38.05% of the gross return otherwise available;
  5% gross return: $4.32194, 3.5% net return net of fees $2.80679: therefore fees are $1.51515, and have absorbed 45.61% of the gross return otherwise available.

In lower-return environments, a fixed percentage fee (typical of many investment products) absorbs a larger proportion of a lower dollar amount of return. Even apparently moderate fees cause a significant drag on long-term returns, and inflation and taxes exacerbate this effect. Academic research confirms that higher-expense funds do not perform well enough to overcome their expense drag: see for example "Performance and Characteristics of Actively Managed Retail Mutual Funds with Diverse Expense Ratios", by John A. Haslem, H. Kent Baker, and David M. Smith, available at: http://papers.ssrn.com/sol3/papers.cfm?abstract_id=1155776

Investors have therefore begun to conclude that lower fees are essential, and one sign of this is the surge of interest in exchange-traded funds (ETF's). Although ETF assets are still small relative to conventional mutual fund assets in the United States (ETF assets are still only 8.5% of conventional mutual fund assets, according to the Investment Company Institute: see http://www.ici.org/pdf/2011_factbook.pdf), they are growing much more quickly than conventional mutual fund assets, and the much lower fees charged (as low as 0.06% per year) are undoubtedly part of the reason.

A low-cost diversified portfolio with a sizeable equity component is therefore a key requirement for investors going forward. This is clearly true during the "accumulation phase": saving for retirement up until say ten years before retirement. However, other considerations (especially guarantees) become important in the "retirement imminent" phase (the decade preceding retirement), as well as once retired.

In the latter two phases, a low-cost diversified portfolio with some level of guarantees is required, as contemplated in e.g. U.S. Pat. No. 7,716,075, U.S. Pat. No. 8,131,612, and http://aria4advisors.com/wp-content/uploads/2012/01/RetireOne_Transamerica_Investor-Brochure_0112.pdf.
See also:
http://www.sec.gov/Archives/edgar/data/845091/000119312511270213/0001193125-11-270213-index.htm Guarantees become critical in the retirement phase because capital, once lost, is hard or impossible to replenish in the absence of employment income. Diversification across multiple equity classes is critical to ensure that returns are not subject to the risk of "backing the wrong horse"—for example, the Nikkei index reached its peak in 1989, fell sharply, and has not yet regained its value. See:
http://www.forecast-chart.com/historical-nikkei-225.html Some degree of low-cost diversification can be achieved through the use of a small number of index funds or ETF's. However, to achieve full diversification a broad variety of assets is required. For example, although an S&P 500 index fund provides diversification amongst 500 American companies making up 70% of the U.S. stock market by market capitalization, the capitalization-weighted nature of the index means that most of the exposure is to large-cap stocks. A truly diversified portfolio would contain many more asset classes than just large-cap U.S. stocks, of course, and might include some or all of the following asset classes:
  Bonds (domestic and foreign-currency-denominated)
  International large-cap equities
  International small-cap equities
  International growth equities
  International value equities
  Cash
  Commodities
  Convertible bonds
  Currency-trading strategies
  Emerging market equities
  Floating-rate notes
  Infrastructure
  Junk bonds (domestic and foreign-currency-denominated)
  Long-short strategies (e.g. 130/30 funds)
  Hedge fund replication strategies
  Covered-call strategies
  Real-return (inflation-protected) bonds
  Real estate
  U.S. large-cap equities U.S. small-cap equities
U.S. growth equities
U.S. value equities
Venture capital investments
Volatility-linked assets Another line of reasoning supporting the construction of extremely diverse portfolios is that under reasonable assumptions they provide a real-world approximation of the growth-optimal portfolio (GOP). See for example "Approximating the Growth Optimal Portfolio with a Diversified World Stock Index", by True Le and Edward Platen, available at:
http://www.qfrc.uts.edu.au/research/research_papers/rp184.pdf
as well as "Capital Growth Theory" by Nils H. Hakansson and William T. Ziemba, available at:
http://www.hakansson.com/nils/papers/capita195.pdf Le & Platen prove, under reasonable regularity assumptions with respect to asset price processes, that sufficiently diversified long-only portfolios approach the GOP in performance. Historical simulations covering the period 1973-2006 and working with slightly more than 100 world sector indices show results substantially outperforming a market-capitalization-weighted index (MCI)—note that a capitalization-weighted index is normally taken to be the standard benchmark against which to assess portfolio performance.

Fortunately, a more diverse portfolio tends to have lower volatility and hence (all other things being equal) lower hedging costs, so the goals of constructing a diversified portfolio and hedging it to protect capital are broadly compatible in theory. There are, however, computational challenges in calculating the option price sensitivities ("Greeks" further defined below) required for portfolio hedging in the case where the portfolio holds many assets.

An option for which the payoff depends on the weighted average of the performance of multiple assets is usually referred to as a basket option. We can therefore refer to an option where the payoff depends on the weighted average of the performance of a large number of assets as a many-asset basket option.

In order to hedge an option payoff (say for example a minimum accumulation benefit), a financial service provider will usually start by computing the "Greeks" for the payoff: the partial derivatives of the payoff amount with respect to changes in asset value, interest rates, volatility, passage of time, and so on. Common ways to do this involve taking advantage of analytical solutions where they exist, and the use of Monte Carlo simulations using common random numbers and numerical differentiation, where analytic solutions are not available.

The use of Monte Carlo simulation to price options is described in, for example, "Options, Futures, and Other Derivative Securities" by John Hull, Prentice-Hall, © 1989. Numerical differentiation is described in, for example, "Numerical Methods" by Germund Dahlquist and Ake Bjorck, Prentice-Hall, © 1974.

An example of the analytical approach, in the case of an option based on a single asset, is to use the Black-Scholes formula and its partial derivatives to calculate the option value, delta, gamma, rho, vega, and theta. A useful reference for this approach is "Options, Futures, and Other Derivative Securities" by John Hull, Prentice-Hall, © 1989.

An example of the second approach, in the case where a basket option (defined below) payoff based on the performance of many assets must be hedged (in the special case where the assets are mutual funds and are assumed to depend strongly on a small number of underlying indices), is given in U.S. Pat. No. 8,131,612.

In the general case, however, where a many-asset basket option (defined below) is to be hedged, and no special structure based on a small number of underlying indices can be assumed, the Monte Carlo simulation plus finite differencing approach can become very inefficient. For example, to calculate two-sided deltas for payoffs based on a portfolio of 100 assets, a total of 201 simulations using common random numbers must be run: 1 base simulation, 100 simulations in which the starting value for each asset is individually reduced to say 99% of its base value, and 100 simulations in which the starting value for each asset is individually increased to say 101% of its base value.

Clearly, since the computational effort increases linearly within each simulation according to number of assets, and also increases linearly in the number of simulations that must be run in order to calculate deltas, the overall effort goes up quadratically, becoming increasingly burdensome as the number of assets becomes large. For example, if Greek computation takes one second for a 8 asset option, then quadratic growth would imply that Greek computation for a 100 asset option would take about $(100/8)^2=156.25$ seconds. If in contrast linear growth could be achieved, then the computation would take 12.5 seconds.

A key concept in dealing with calculating Greeks for complex payoffs incorporating behavioral assumptions is reverse mode automatic differentiation (also called adjoint differentiation, or backwards differentiation), which is a specific application of the multivariate chain rule of differential calculus, as described in (for example) Theorem 1.8.4 in "Vector Calculus, Linear Algebra, and Differential Forms: A Unified Approach" (2nd ed.) by John H. Hubbard and Barbara Burke Hubbard, Prentice Hall © 2002. The matrix of required partial derivatives for application of the multivariate chain rule is known as the Jacobian.

The backwards differentiation concept was first developed in detail by Paul J. Werbos in his 1974 Harvard Ph. D. thesis "Beyond Regression: New Tools for Prediction and Analysis in the Behavioral Sciences", and is described in some detail (as "the Chain Rule for Ordered Derivatives") in Section 3.1 of "Backwards Differentiation in AD and Neural Nets: Past Links and New Opportunities" by Paul J. Werbos, available at:
http://www.werbos.com/AD2004.pdf The concept was later independently rediscovered by B. Speelpenning in his 1980 Ph. D. thesis "Compiling fast partial derivatives of functions given by algorithms", in which he observed that the number of operations required to compute the partial derivatives of a scalar function with respect to the input variables is bounded above by a fixed constant times the number of operations required to compute the function itself. Depending on what counts as an "operation" this fixed constant is in the range 3 to 5. See "Implementing Automatic Differentiation Efficiently" by David Juedes and Andreas Griewank, Argonne National Laboratory, 1990, available at:
http://www.crpc.rice.edu/softlib/TR_scans/CRPC-TR90057throughTR90088/CRPC-TR90074.PDF The approach to adjoint differentiation that is often adopted is to explicitly construct Jacobian matrices: see for example:
"Jacobian Code Generated by Source Transformation and Vertex Elimination can be as Efficient as Hand-Coding" by Shaun A. Forth, Mohamed Tadjouddine, John D. Pryce, and John K. Reid, available at: http://www.amorg.co.uk/AD/PUBS/saf_toms04.pdf; and "On the Calculation of Jacobian Matrices by the Markowitz Rule for Vertex Elimination", by Andreas Griewank and Shawn Reese, 1991, available at: ftp://info.mcs.anl.gov/pub/tech_reports/reports/P267.ps.Z; or "Recipes for Adjoint Code Construction", by Ralf Giering and Thomas Kaminski, available at: http://citeseerx.ist.psu.edu/viewdoc/summary?doi=10.1.1.30.7838.

The Jacobian approach is most practical if used with a source code transformation tool, so that the user is not explicitly concerned with sparse matrix operations. There is a large literature on source code transformation, of which the above-cited papers are representative, with the tools ADOL-C and TAMC being well-known.

The source code transformation approach clearly leads to additional complexity and makes debugging more difficult. It is also inapplicable if a language well-suited to the problem domain has no available source code transformation tool (most tools to date focus on Fortran and C).

However, an approach can be developed that does not require the use of sparse matrix operations. See for example "Introduction to Automatic Differentiation and MATLAB Object-Oriented Programming", by Richard D. Neidinger, available at:
http://scitation.aip.org/getpdf/servlet/
GetPDFServlet?filetype=pdf&id=SIREAD000052000003000545000001&idtype=cvips&doi=10.1137/
080743627&prog=normal&bypassSSO=1

In Section 7 of the paper, Neidinger suggests that reverse mode differentiation can be performed via solution of a large sparse set of linear equations, as is contemplated in the previously-cited references, and also describes how, for a small straight-line block of code, computations can be arranged in a directed acyclic graph ("DAG"). Indeed, in compiler theory, it has long been known that computation of variables within a straight-line block of code (a so-called "basic block") can be represented as a DAG (See Section 12.3, "The DAG Representation of Basic Blocks" in "Principles of Compiler Design", by Alfred V. Aho and Jeffrey D. Ullman, Addison-Wesley, © 1977, 3rd printing April 1979).

An extension of the DAG representation of basic blocks can be developed that allows programs using backwards differentiation to be written more naturally, i.e. without the use of source code transformation, if a vectorized dynamically-typed language is available.

SUMMARY

According to aspects illustrated herein, there is provided a computer-based system for computing sensitivities of a behaviorally path-dependent value for a financial product issued at a first time of issue, including: a memory unit for at least one specially programmed computer configured to store: computer readable instructions; a set of path-dependent behavioral assumptions; and a set of economic variables representing financial market conditions at the first time of issue of said financial product. The system includes a processor for the at least one specially programmed computer configured to execute the computer readable instructions to perform a vectorized adjoint differentiation forward pass including: generating a full or pruned directed acyclic graph (DAG) representation of a procedure for computation of the behaviorally path-dependent value for the financial product; computing, using the DAG representation, the behaviorally path-dependent value for the financial product; and performing an adjoint differentiation backward pass on said full or pruned DAG representation to obtain a result. The processor is configured to execute the computer readable instructions to determine, using the result, a set of sensitivities for the behaviorally path-dependent value for the financial product; and display the set of sensitivities for the behaviorally path-dependent value on a graphical user interface for the at least one specially programmed computer.

According to aspects illustrated herein, there is provided a computer-based method for computing sensitivities of a behaviorally path-dependent value for a financial product issued at a first time of issue, including: storing in a memory unit for at least one specially programmed computer readable instructions, a set of path-dependent behavioral assumptions, and a set of economic variables representing financial market conditions at the first time of issue of said financial product; and using a processor for the at least one specially programmed computer to execute the computer readable instructions to: perform a vectorized adjoint differentiation forward pass including generating a full or pruned directed acyclic graph (DAG) representation of a procedure for computation of the behaviorally path-dependent value for the financial product, computing, using the DAG representation, the behaviorally path-dependent value for the financial product, and performing an adjoint differentiation backward pass on said full or pruned DAG representation to obtain a result; determine, using the result, a set of sensitivities for the behaviorally path-dependent value for the financial product; and display the set of sensitivities for the behaviorally path-dependent value on a graphical user interface for the at least one specially programmed computer.

DETAILED DESCRIPTION

While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The following definitions are applicable:

Active variable: Variables that are represented via indirection into the arrays representing a full or pruned directed acyclic graph (DAG).

Basket Option: An option for which the payoff depends on the weighted average of the performance of multiple assets. For example, the option payoff depends on the returns of n different assets over the option term and on the option strike K, where the option payoff is max(($\Sigma W_i (S_i^T/S_i^0)$)−K, 0) where the sum is over i from 1 to n.

Cover function or wrapper function: Note that these two terms are synonymous. A cover, or wrapper, function operates as follows. Instead of calling a function directly, the function is called indirectly through a cover or wrapper function that does some additional computation as well as the intended main operation. For example, instead of directly invoking the plus function "+" to add two vectors by using the expression "a+b" in a forward pass (described below), a program invoking a vectorized cover or wrapper function uses the expression "a plus b", which not only adds the two vectors but also creates a DAG node (described below) that is configured for a backward pass (described below).

Directed acyclic graph (DAG): In a computer programming context, a directed graph with no cycles which gives a picture of how the value computed by each statement in a basic block is used in subsequent statements in the block.

Full DAG representation: In a data flow, replacing "variables" with "versions of variables", in effect treating each overwrite of an existing variable as a new variable, to represent the data flow as a DAG even in the presence of branching, looping, function call, or other control structures.

Greeks: Option price sensitivity. "Greeks" are defined in many standard references including "Pricing Financial Instruments: The Finite Difference Method", by Domingo Tavella and Curt Randall, John Wiley & Sons, © 2000. For example:
delta=$\partial V/\partial S$;
gamma=$\partial^2 V/\partial S^2$;
rho=$\partial V/\partial r$;
vega=$\partial V/\partial \sigma$; and
theta=$\partial V/\partial t$ V is a present value of a cash flow, S is a value of a hedging instrument, r is an initial condition in a yield curve, $\sigma$ is volatility of a hedging instrument, and t is time.

Many-asset basket option: A basket option for which the payoff depends on the weighted average of the performance of a large number of assets Many-asset portfolio; In one example, a portfolio having 100 assets or more.

Multi-asset portfolio: In one example, a portfolio having 1 to 10 assets.

Pruned DAG: Treating a full DAG representation as a stack, so that the full DAG can periodically be cut back, improving performance by dramatically reducing memory allocation requirements. This is demonstrated in file 'ex12b,' where the process is referred to as stripmining.

Sensitivity: Partial derivative of a financial product value with respective to a change in one of the active variables. Active variables include, but are not limited to: initial asset values, basket weights, changes in options, and lapse rates.

Vectorized adjoint differentiation forward pass: Calculation of the financial product value using the cover functions disclosed herein (including vectorized cover functions) and the full or pruned DAG representation.

The present disclosure enables operations with values for a financial product incorporating, for example, a many-asset basket option payoff incorporating behavioral assumptions (e.g. with respect to voluntary terminations [lapses] of the financial product) as an extension of standard option pricing. For greater realism, the behavioral assumptions vary with the prices of the underlying assets or other economic variables, since it is reasonable to expect that the future behavior of the financial product holder might be influenced by then-current economic conditions.

The present disclosure uses a simple, regular data representation of the full DAG, using a limited number of arrays and one level of indirection, together with a cover function for each arithmetic primitive. In the full DAG representation, variables are represented as vectors of indices into the integer arrays 'nargs,' 'parent1,' 'parent2' and the double-precision floating point arrays 'partial1,' 'partial2,' and 'bar.' As a result of the use of these cover functions, this representation of the full DAG, and this indirect representation of the active variables, programs implementing backwards differentiation with respect to the active variables can be written directly in APL, using a style that is intelligible to a typical APL programmer—no source code transformation tool is required. Although the example programs work with unary and binary operators, it will be obvious to one skilled in the art how to generalize the program to, for example, ternary operators. The full DAG representation implies that no cover functions are required for control operations such as looping, so native language control structures can be used freely.

Given underlying vector operations, code generation for APL and APL-like languages (such as J) is a solved problem—take for example the 10-state shift-reduce parser described in "An Implementation of J" by Roger Hui, Iverson Software, 1992. Vectorized languages like J or APL are well suited to Monte Carlo simulation and modelling.

Similarly, many modern object-oriented languages such as C++ or C# provide an operator-overloading facility, although without a vector datatype the overhead of maintaining the full DAG might become noticeable.

Since the structure of the reverse pass of the computation does not lend itself to a vectorized language, the present disclosure goes outside the vectorized paradigm to make a helper DLL for the reverse pass computation written in Delphi or some other compiled language.

Additionally, given the data representation of the full DAG, the reverse pass algorithm is extremely regular and can be performed so that the compiled "chase-back" function operates independently of which cover functions were invoked in the forward pass, leading to a huge increase in speed.

The present disclosure provides a workable (linear growth in number of assets) solution for the many-asset sensitivity calculation problem.

Note that results from function 'ex10a' (which performs a delta calculation using resimulation using common random numbers and finite differences) and function 'ex10b' (which uses adjoint differentiation) converge in the limit as more and more Monte Carlo simulations and smaller and smaller finite difference spacings are used. Similarly results from function 'ex11b' and function 'ex12b' approach results from 'ex10b' as more and more Monte Carlo simulations are performed.

Function 'back'—backs up through the full or pruned DAG (with active variable var as final value) to fill in adjoint variables all the way back to the start of the computation. Because this process is so regular, and does not depend on the details of the forward pass, it can be performed in a compiled function.

Function 'copyvec'—copies values into an existing (non-empty) vector of active variables. Sets relevant semi-global array entries and returns a vector of indices into them. Parents of the active variables are set to zero and hence backward propagation of adjoint variables will not proceed backward through variables created using copyvec.

Function 'divide'—the cover functions for binary operators have a simple and regular structure, and this one provides a good example. The method of operation is to bump the stack index, set the result value to the value of variable v1 divided by the value of variable v2, set nargs (number of arguments) to 2 (noting that this node has both left and right parents because its being created using a binary operator), note that the left parent is v1 and the right parent is v2, and then fill in the left and right partial derivatives, which are the reciprocal of v2 (the partial derivative of the result with respect to v1, i.e. holding v2 as constant), and the negative of v1 divided by v2 squared (the partial derivative of the result with respect to v2, i.e. holding v1 as constant).

Function 'ex10a'—computes deltas for a basket option incorporating a behavioral assumption with respect to voluntary termination (lapse) using recur10a as a subroutine. Each initial asset price is moved up by a small amount and down by a small amount, and the resulting value payoff (incorporating changes in the dollar amount of the payoff for option holders who persist to the end of the option term, the assumed change in persistency resulting from the change in the asset price paths, and any intermediate cash flows) is computed. The deltas are computed from these perturbed values using standard finite difference techniques.

Function 'ex10b'—computes deltas as for 'ex10a' but using adjoint differentiation. Other sensitivities such as with respect to change in base lapse rates are available through use of the corresponding adjoint (bar) variable once the backward pass has been performed by calling the "back" function. For example, in line 72 of "ex10b" the "getbar" function is invoked with respect to the variable origx (the assumed starting values for each asset) in order to calculate delta (one of the Greeks) for the total payout of the accumulation product. It is easy to compute other sensitivities (not necessarily Greeks) using the same method: for example, "getbar" of "w" (the basket weights assigned in line 26 of the function) yields the derivative of the total payoff with respect to each the basket weights, and "getbar" of "strike" (the option strike price assigned in line 55) yields the derivative of the total payoff with respect to "strike." As a further example, "getbar" of "lrate" gives the derivative of the total payoff with respect to each of the 14 elements of the "lrate" vector (the vector of the assumed lapse rate). Standard actuarial practice if these sensitivities were required would be to rerun the simulation repeatedly, perturbing each of elements of "lrate" in turn.

The following describes an example operation of the present disclosure:
  set up semi-global arrays used by cover functions;
  set up problem variables including assumed interest rates and asset correlation;
  set up active variables including assumed base lapse rates over the projection period, basket weights, and initial asset values. Because these are active variables, sensitivities can be computed for them;
  simulate a sequence of returns for each asset, and combine asset prices with basket weights to obtain simulated account values;
  apply an assumed dynamic lapse function (behavioral assumption) based on simulated account values, and track simulated cash flows from the financial product;
  determine simulated cashflow at end of the projection period;
  perform "back" function to calculate adjoint variables; and
  return desired sensitivities—in this case deltas, but sensitivities with respect to any active variable are available once the back function has been performed.

Function 'ex11b'—this function is similar to 'ex10b,' but it uses function 'copyvec' where possible instead of function 'setvec' to reduce stack usage.

Function 'ex12b'—similar to 'ex11b' but additionally uses a strip-mining technique to cut back the full DAG to a pruned DAG, further reducing stack usage.

Function 'getbar'—gets adjoint value for a variable v, i.e. the partial derivative of the objective function with respect to changes in that variable v, after the "back" function has been performed to trace back through the full or pruned DAG.

Function 'max0vec'—the cover functions for unary operators have a simple and regular structure, so this one is used as an example. Note that for Monte Carlo evaluation of option Greeks it is sufficient for the payoff function to be differentiable "almost everywhere", i.e. except on a set of measure zero. The method of operation is to bump the stack index, set the result to the function 'maximum' of variable v1 and a value of zero, set nargs (number of arguments) to 1 (noting that this node has only a left parent), note that the left parent is v1, and then fill in the left partial derivative, which is one if the value of v1 is greater than or equal to zero and zero otherwise. The right partial derivative is always zero because the function is unary.

The following are further functions:

Function 'minusvec'—subtracts two active vector variables.

Function 'norm'—generates normal random variates using the Box-Muller transform.

Function 'plus'—adds two active scalar variables.

Function 'plusvec'—similar to 'plus' but adds two active vector variables.

Function 'rampfn'—a ramp function (like a differentiable version of a Heaviside step function: becomes a Heaviside step function in the limit) implemented using the hyperbolic tangent function.

Function 'rampvec'—similar to 'rampfn' but allows for vector left and right arguments.

Function 'rebff2'—A randomly-generated matrix will not in general be usable as a correlation matrix, since the resulting covariance matrix will not be positive-symmetric definite. In Section 7.4.3 of his book "Modern Pricing of Interest-Rate Derivatives" © 2002, Princeton University Press, Riccardo Rebonato specified three functional forms for interest rate correlations. This function adapts his second functional form to the many-asset case.

The following are further functions:

Function 'recur10a'—performs Monte Carlo simulation of option holder behavior assuming base lapse rates and market-sensitive (i.e. asset price path dependent) lapse rates.

Function 'set'—creates an active scalar variable initialized to a specific scalar value.

Function 'setvec'—creates an active vector variable initialized to a specific vector value.

Function 'svd3'—a routine that calls out to file 'svd3.dll' (a compiled dynamic link library) to factor a matrix into two orthogonal matrices and a diagonal matrix using the singular value decomposition (SVD). Singular value decomposition is described in many source including "Linear Algebra and Its Applications", 2nd Edition, by Gilbert Strang, Academic Press, © 1980, and "Matrix Computations", by Gene H. Golub and Charles F. Van Loan, © 1989. Use of the SVD instead of APL's built-in matrix inversion operation ensures that reasonable results can be obtained even when the asset covariance matrix is near-singular.

The following are further functions:

Function 'times'—multiplies two active scalar variables.

Function 'timesvec'—multiplies two active vector variables.

Function 'adjhelp1.dll, entry 'back'—this is the only function exported from the adjhelp1 DLL. It is designed to allow working with a pruned DAG as in 'ex12b.' Other uses of 'back' rely on shy (optional) left argument defaulting to zero, i.e. working with the full DAG.

The method of operation includes running backwards through the arrays filled in by the cover functions during the forward pass to calculate the adjoint ('bar') variables, as follows:
  Set 'bar' (ordered derivative or adjoint variable) for the final result variable to 1, since the partial derivative of the result with respect to itself is one; and, Step back through the (possibly pruned) DAG, applying the multivariate chain rule for each variable to accumulate bar for each of its 0, 1, or 2 parent variables, until reaching the first node in the DAG.

FIG. 1 is a schematic block diagram of computer-based apparatus 100 for computing sensitivities of a behaviorally path-dependent value for a financial product issued at a time of issue. Apparatus 100 includes memory unit 102 and processor 104 for at least one specially programmed computer 106. Unit 102 is configured to store computer readable instructions 108, set 110 of path-dependent behavioral assumptions 112, and set 114 of economic variables 116 representing financial market conditions at the time of issue of the financial product. Processor 104 is configured to execute computer readable instructions 108 to perform vectorized adjoint differentiation forward pass 118. Performing forward pass 118 includes: generating full or pruned directed acyclic graph (DAG) representation 120 of procedure 122 for computation behaviorally path-dependent value 124 for financial product 126; computing, using DAG representation 120, behaviorally path-dependent value 124 for financial product 126; and performing adjoint differentiation backward pass 128 on full or pruned DAG representation 120 to obtain result 130.

Processor 104 is configured to execute computer readable instructions 108 to: determine, using result 130, set 132 of sensitivities 134 for behaviorally path-dependent value 124 for financial product 126; and display set 132 of sensitivities 134 for behaviorally path-dependent value 124 for financial product 126 on graphical user interface 136 for the at least one specially programmed computer 106. In an example embodiment, financial product 126 includes accumulation product 138 with benefit optionality 140. In an example embodiment, set 132 of sensitivities 134 includes a set of hedging parameters 142 for financial product 126. In an example embodiment, performing vectorized adjoint differentiation forward pass 118 includes using at least one cover function 144 including vectorized cover function 146.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-based apparatus for computing sensitivities of a behaviorally path-dependent value for a financial product issued at a first time of issue, comprising:
    a memory unit for at least one specially programmed computer configured to store:
        computer readable instructions;
        a set of path-dependent behavioral assumptions; and,
        a set of economic variables representing financial market conditions at the first time of issue of said financial product; and
    a processor for the at least one specially programmed computer configured to execute the computer readable instructions to:
        perform a vectorized adjoint differentiation forward pass including:
            generating a full or pruned directed acyclic graph (DAG) representation of a procedure for computation of the behaviorally path-dependent value for the financial product;
            computing, using the DAG representation, the behaviorally path-dependent value for the financial product; and,
            performing an adjoint differentiation backward pass on said full or pruned DAG representation to obtain a result;
        determine, using the result, a set of sensitivities for the behaviorally path-dependent value for the financial product; and,
        display the set of sensitivities for the behaviorally path-dependent value on a graphical user interface for the at least one specially programmed computer.

2. The computer-based apparatus of claim 1, wherein:
said financial product includes an accumulation product with benefit optionality; and,
said set of sensitivities includes a set of hedging parameters for the financial product.

3. The computer-based apparatus of claim 1, wherein:
performing the vectorized adjoint differentiation forward pass includes using at least one cover function including a vectorized cover function.

4. A computer-based method for computing sensitivities of a behaviorally path-dependent value for a financial product issued at a first time of issue, comprising:
    storing in a memory unit for at least one specially programmed computer:
        computer readable instructions;
        a set of path-dependent behavioral assumptions; and,
        a set of economic variables representing financial market conditions at the first time of issue of said financial product; and
    using a processor for the at least one specially programmed computer to execute the computer readable instructions to:
        perform a vectorized adjoint differentiation forward pass including:
            generating a full or pruned directed acyclic graph (DAG) representation of a procedure for computation of the behaviorally path-dependent value for the financial product;
            computing, using the DAG representation, the behaviorally path-dependent value for the financial product; and,
            performing an adjoint differentiation backward pass on said full or pruned DAG representation to obtain a result;
        determine, using the result, a set of sensitivities for the behaviorally path-dependent value for the financial product; and,
        display the set of sensitivities for the behaviorally path-dependent value on a graphical user interface for the at least one specially programmed computer.

5. The computer-based system of claim 4, wherein:
said financial product includes an accumulation product with benefit optionality; and,
said set of sensitivities includes a set of hedging parameters for the financial product.

6. The computer-based system of claim 4, wherein:
performing the vectorized adjoint differentiation forward pass includes using at least one cover function including a vectorized cover function.

* * * * *